Patented Dec. 14, 1943

2,337,004

UNITED STATES PATENT OFFICE 2,337,004

CONDENSATION OF AMINES WITH ALKYLENE OXIDES

Edward J. Schwoegler, Wyandotte, Mich., assignor to Sharples Chemicals Inc., a corporation of Delaware No Drawing. Application March 27, 1941, Serial No. 385,463

7 Claims. (Cl. 260—584)

The present invention pertains to the manufacture of aliphatic amines containing at least one alkylol radical as well as one or two aliphatic hydrocarbon radicals, as substituents for hydrogen of ammonia. The invention was conceived and developed in connection with efforts to provide an economical method of producing a di-alkyl amine having an alkylol radical substituted for the third hydrogen atom of the ammonia molecule, such as diethyl amino ethanol, and it will be discussed with particular reference to that problem.

It is a well known fact that aqueous solutions of ammonia may be condensed with alkylene oxides to produce alkylol amines, this process having been described by Wurtz in 1860 (Liebig's Annalen der Chemie, volume 114, pages 51 to 54). Similar processes in which aqueous solutions of aliphatic amines are condensed with alkylene oxides are also well known (see German Patent No. 97,102, of March 30, 1897, and pages 61 and 62 of Bodforss' work on "Die Aethylenoxyde").

In the manufacture of the simple alkylol amines in accordance with the Wurtz process, and also in the manufacture of the alkyl-substituted alkylol amines by the same general technique, these products have been manufactured by processes involving presence of very substantial quantities of water in the reaction mixture. Bodforss refers to the fact that violent explosions occur even when concentrated ammonia liquid is used, and states that pure ethylene oxides does not react with carefully dried ammonia gas. Professor Frank C. Whitmore, in his work on Organic Chemistry (Van Nostrand Co., 1937) makes the statement (page 373) that "Diethyl amine and ethylene oxide do not unite dry." Kautter, in U. S. Patent 2,051,486, indicates that the reaction between alkylene oxides and dry ammonia is very slow "at temperatures at which the reactants and reaction products are substantially stable." (Page 1, column 2, lines 3 to 6.)

As a result of the above-discussed limitations in prior art procedure, methods of making alkyl amino alkanols have ordinarily been conducted by condensing alkylene oxides with aqueous amine solutions containing very substantial proportions of water. As a consequence of this fact, it has been necessary to conduct a special, and sometimes difficult, step of dehydration in order to separate water from the finished product. In the case of diethyl amino ethanol, dipropyl amino ethanol, dibutyl amino ethanol, and the corresponding dialkyl amino propanols and butanols, considerable difficulty is encountered in the dehydration step because of the fact that these amines form constant boiling mixtures with water.

An object of the present invention has been to provide a method of producing dialkyl amino alkanols, mono-alkyl amino alkanols, and mono-alkyl alkylol amines in unusually high yields by a process which avoids the presence of water in any large proportion. The process of the present invention is preferably conducted under substantially anhydrous conditions.

The invention will be discussed in the first instance by reference to the manufacture of diethyl amino ethanol, and the practice of the process of the invention in making other related compounds by condensation of alkylene oxides with aliphatic amines will thereafter be considered.

In the manufacture of diethyl amino ethanol, it has been customary to mix a water-containing solution of diethyl amine with ethylene oxide by passing the ethylene oxide gradually into a large body of the amine. The reaction takes place initially at a temperature in the neighborhood of 40° C., and the rate of addition of the ethylene oxide and other factors affecting the temperature are rigorously controlled to avoid the development of temperatures in excess of 100° C.

When anhydrous diethyl amine is contacted with anhydrous ethylene oxide at the temperatures employed in the prior art reaction for producing diethyl amino ethanol in the presence of large quantities of water, as discussed above, no reaction whatever takes place. It is perhaps for this reason that Whitmore and others have been of the opinion that dry ethylene oxide does not react with dry diethyl amine.

In pursuing research to develop a method of producing diethyl amino ethanol under anhydrous conditions, the present applicant has discovered that the prior art supposition that the diethyl amine does not reach with ethylene oxide under anhydrous conditions is erroneous. He has discovered that, when a body of dry diethyl amine is heated to a temperature substantially in excess of the temperatures used in the aqueous method, i. e., substantially above 100° C., reaction between ethylene oxide and diethyl amine occurs with considerable evolution of heat. Thus, when a body of the anhydrous amine is heated to 150° C. and contacted with ethylene oxide at that temperature, the resulting reaction is so rapid that a violent explosion may occur unless care is taken to restrict the amount of unreacted ethylene oxide in contact with the amine, to abstract heat from the reaction mixture at a rapid rate, or exercise both of these precautions simultaneously.

In the practice of this process, it is desirable that the ethylene oxide be added gradually to a large body of the amine, and the invention cannot be practiced satisfactorily by the reverse procedure of adding the amine gradually to the ethylene oxide, since practice of the invention in this manner would result in production of compounds having two or more ether linkages, and very high molecular weight.

In the practice of the invention, it is desirable not only that the amine be heated to a high temperature before being mixed with any substantial quantity of the ethylene oxide, but it is also desirable that the presence of a large proportion of ethylene oxide in the reaction mixture be avoided at all times. If the temperature of the reaction mixture is allowed to fall below the reaction temperature at any time during the continued introduction of the ethylene oxide, there is danger of accumulation of a proportion of ethylene oxide so great as to cause violent reaction with great evolution of heat and danger of explosion, when the temperature is again raised to the reaction point.

Heat should be abstracted from the reaction mixture at all times during the practice of the invention, after the amine has once reached a temperature at which the reaction proceeds at a lively rate. If, for any reason, the temperature becomes suddenly lower, it is desirable that introduction of ethylene oxide be suspended, and the reaction mixture heated until the reaction is again resumed, before resuming introduction of the ethylene oxide. The abstraction of heat from the reaction mixture may be accomplished artificially by providing a jacket through which cooling fluid circulates, or resort may be had to normal heat exchange between the reaction vessel and the outside atmosphere for the necessary abstraction of heat. In case no artificial cooling means are provided, it will be desirable to introduce the ethylene oxide very gradually, in order to avoid too sudden generation of heat.

To summarize and simplify the above discussion with respect to manufacture of diethyl amino ethanol, the process may be described as one in which the amine is first heated to a temperature substantially above 100° C., and preferably within the range of 130 to 160° C. before starting the introduction of ethylene oxide, or at least before any very large proportion (e. g., in excess of a molar ratio of 30%) of ethylene oxide has been added. After the reaction has been fairly started, as evidenced by evolution of heat, further external heating will be unnecessary, and the reaction may be completed by gradually continuing addition of ethylene oxide either in a continuous stream or batchwise, controlling the relative rates of addition of ethylene oxide and abstraction of heat in such a manner that the reaction continues at about the rate at which the ethylene oxide is being introduced, without accumulation of a large volume of unreacted ethylene oxide in the reaction vessel at any time.

The invention is preferably practiced in a closed reaction vessel under substantial superatmospheric pressure, e. g., under a pressure between 100 and 600 lbs. per square inch in the manufacture of diethyl amino ethanol and related compounds. The maintenance of super-atmospheric pressure results in very great improvement in conversion. As an example of this fact, experiments involving condensation of ethylene oxide with dibutyl amine have resulted in 63.9% conversion in cases in which the reaction occurred at atmospheric pressure, and in 93% conversion when a pressure of 215 lbs. per square inch was employed. The rate of addition of the ethylene oxide and the rate of abstraction of heat from the reaction mixture are preferably correlated in such a way as to maintain the reaction in progress as long as any ethylene oxide is contained in the mixture, and these factors are also very carefully controlled to avoid development of reaction temperatures in the mixture which are above the decomposition point of the formed diethyl amino ethanol. Thus, it is desirable that the temperature be maintained above 100° C. and below 275° C. during the practice of the entire process, after the commencement of the addition of ethylene oxide. The same temperature range is suitable for manufacture of all dialkyl amino alkanols containing between 1 and 4 carbon atoms in the alkyl radicals and between 2 and 4 carbon atoms in the alkylol radicals, and all mono-alkyl amino alkanols containing between 2 and 8 carbon atoms in the alkyl radical and between 2 and 4 carbon atoms in the alkylol radical. If a molar accumulation of over 30% of ethylene oxide is allowed to occur in the reaction mixture, this accumulation is extremely dangerous, and it is preferable to destroy the entire reaction mixture rather than incur the risk of explosion which would be involved in an attempt to continue the reaction under these conditions.

While the invention has been discussed above specifically with reference to the manufacture of diethyl amino ethanol, the principles of the invention may be practiced in the manufacture of a wide variety of alkyl alkylol amines, such as dimethyl amino ethanol, mono-ethyl, -propyl, -butyl, -amyl, -hexyl, -heptyl, -octyl, etc. amino ethanol, propanol or butanol, the corresponding cyclo-aliphatic alkyl amino alkanols, and various other amines containing at least one alkyl radical and at least one alkylol radical, even in cases in which the sum of said alkyl radicals may contain as many as 8 carbon atoms. The invention is also applicable to the condensation of mixed dialkyl amines, such as mono-butyl mono-ethyl amine with alkylene oxides.

The invention may also be applied in condensation of unsaturated aliphatic amines, such as mono- and di-allyl and -crotyl amines with ethylene oxide, propylene oxide and butylene oxide. Hydroxy alkylene oxides containing between 2 and 4 carbon atoms may also be condensed with amines containing a total of between 1 and 8 carbon atoms in the practice of the invention to produce alkyl amino derivatives of polyhydric alcohols.

In the manufacture of all of the various compounds discussed above, the same technique as that discussed above with respect to the manufacture of diethyl amino ethanol will be observed, in that the aliphatic amine to be condensed with ethylene oxide will first be heated to the reaction temperature before adding any large proportion of the alkylene oxide, and the alkylene oxide will thereafter be added during continuance of the reaction, while heat is abstracted from the reaction mixture, either naturally or artificially, at such rate as to avoid development of a temperature which results in degradation of the finished product. As a general proposition, both the minimum and maximum temperatures to be maintained in the practice fo the process will be higher in case of manufacture of amines having longer alkyl and/or longer alkylol radicals than in the case of amines having shorter radicals. Thus, in the manufacture of dimethyl amino ethanol, the temperatures to be maintained are somewhat lower than those in the case of the corresponding diethyl amino ethanol, whereas the temperatures to be maintained in the manufacture of dibutyl amino butanol are much higher than those employed in the manufacture of diethyl amino ethanol. In the manufacture of dibutyl amino ethanol, for example, the best temperature for starting the reaction is between 180 and 200° C.

Example I—Preparation of dipropyl amino ethanol 2020 grams of dipropyl amine are charged into an autoclave and heated to 160° C. with agitation. At this temperature a pressure of approximately 100 pounds per square inch is formed. 150 g. of ethylene oxide are then pumper into the heated amine; this is approximately one-fifth of the total amount of ethylene oxide used. A temperature rise to 141° C. occurs and then the temperature will be observed to drop off. At this point the remainder of the ethylene oxide (600 grams) is pumped into the autoclave over a period of fifty minutes. The pressure slowly drops as the ethylene oxide is added. The products are cooled, removed from the autoclave and fractionated. 2267 g. of dipropyl amino ethanol boiling at 193°–195° C. are obtained after removal of the heads. This corresponds to a conversion of 96% based on the ethylene oxide used.

Example II—Preparation of di-isopropyl amino ethanol 2020 g. of di-isopropyl amine are charged into an autoclave and heated to 200° C. with agitation. At this temperature a pressure of 240 pounds per square inch is formed. 750 g. of ethylene oxide are then slowly pumped in over a period of sixty-five minutes. A small rise in pressure observed at the start of the ethylene oxide addition, but as the addition proceeds the pressure slowly drops. The products are cooled, removed from the autoclave and fractionated. 2292 g. of di-isopropyl amino ethanol boiling at 188°–191° C. are obtained after the removal of unreacted di-isopropyl amine. This corresponds to a conversion of 93% based on the ethylene oxide used.

Example III—Preparation of dimethyl amino ethanol 1800 g. of dimethyl amine are charged into an autoclave and heated to 150° C. with agitation. At this temperature a pressure of approximately 550 pounds per square inch is obtained. 1496 g. of ethylene oxide are then slowly pumped in over a period of one hour and a half. After the initial addition of ethylene oxide a pressure rise is observed, but upon further addition of ethylene oxide the pressure slowly drops. The products are cooled, removed from the autoclave and fractionated. 2875 g. of dimethyl amino ethanol are obtained after the heads are removed. This compound has a boiling point of 132°–134° C. and the amount obtained corresponds to a conversion of 95% based on the ethylene oxide used.

Example IV—Preparation of diethyl amino propanol 1460 g. of diethyl amine are charged into an autoclave and heated to 175° C. with agitation. At this temperature a pressure of 270 pounds per square inch is obtained. 986 g. of propylene oxide are slowly pumped into the amine over a period of sixty minutes. At the start of the propylene oxide addition a small rise in pressure is observed, but upon continued addition the pressure slowly decreases. After the addition is complete, the products are cooled, removed from the autoclave and fractionated. 2241 g. of 3 dimethyl amino propanol-2 were obtained, which boiled at 154°–160° C. This corresponded to a 90.2% conversion based on propylene oxide used.

Example V—Preparation of ethyl amino ethanol 1800 g. of ethyl amine are placed in an autoclave and heated to 100° C. with agitation. At this temperature a pressure of approximately 175 pounds per square inch is observed. 1500 g. of ethylene oxide are slowly pumped in over a period of two hours. At the beginning of the addition a pressure rise is observed but on further ethylene oxide addition this drops. A temperature rise is also observed, but this is controlled and not allowed to go above 140° C., by external cooling of the autoclave. The products are then cooled and removed from the autoclave. Upon fractionation, 1620 g. of ethyl amino ethanol boiling at 166°–168° C. and 828 g. of ethyl diethanol amine boiling at 248°–250° C. are obtained after removal of unreacted ethyl amine. These correspond to a conversion of 53.6% to ethyl amino ethanol and 36.8% to ethyl diethanol amine.

Example VI—Preparation of ethyl diethanol amine 900 g. of ethyl amine are charged into an autoclave and heated to 100° C. with agitation. At this temperature a pressure of approximately 175 pounds per square inch is observed. 1496 g. of ethylene oxide are slowly pumped into this amine over a period of two hours. A rise in temperature and pressure is observed, but the pressure decreases slowly after further addition of ethylene oxide. The temperature rise, however, is controlled by externally cooling the autoclave. The products are then cooled and removed from the autoclave. Upon fractionation 481 g. of ethyl amino ethanol and 2390 g. of ethyl diethanol amine are obtained. The residue also contains a small amount of N hydroxy ethoxy ethyl N, hydroxy ethyl ethyl amine. On the basis of ethylene oxide used the above corresponds to a conversion of 27% to ethyl amino ethanol and a 64.5% conversion to ethyl diethanol amine.

Example VII—Preparation of diallyl amino ethanol 1140 g. of diallyl amine are charged into an autoclave and heated at 135° C. with agitation. At this temperature a pressure of approximately 40 pounds per square inch is observed. 750 g. of ethylene oxide are then pumped slowly into the amine over a period of fifty minutes. A temperature and pressure rise is noted at the start of the ethylene oxide addition. The pressure slowly drops on further addition of ethylene oxide, but it is necessary to control the temperature rise by external cooling of the autoclave. When addition is complete, the products are cooled, removed from the autoclave and fractionated. 1511 g. of diallyl amino ethanol are obtained after the heads are distilled. This product boils at 195°–197° C. and the amount obtained corresponds to a conversion of 87.9% based on ethylene oxide used.

*Example VIII*

3,354 pounds of diethyl amine are charged into a 900 gallon autoclave built to withstand pressures up to 250 pounds per square inch. The autoclave is a steel clad vessel equipped with a motor driven (direct drive) agitator and jacketed for heat interchanging. The amine is heated to 132° C. and at this temperature a pressure of 215 pounds per square inch is observed. 340 pounds, one-fifth of the total amount of ethylene oxide, are then pumped into the autoclave. A slight rise in temperature and pressure occurs at the start of the addition but on further addition of ethylene oxide this pressure slowly drops. The temperature of the reaction is maintained at from 134° to 150° C., and the remainder of the ethylene oxide is pumped at that temperature. Three and one-half hours are required to pump 1700 pounds of the ethylene oxide. Toward the end of the reaction the temperature is allowed to reach 154° C. When the reaction is complete cool water is circulated through the jacket surrounding the autoclave and the products are cooled to 40° C. The cooled products are then transferred to a distillation system and fractionated. After removal of the heads, 4,204 pounds of diethyl amino ethanol boiling between 159.5–161.5° C. are obtained. This corresponds to a conversion of 93.1% based on ethylene oxide used.

In the above examples, the practice of the invention has been described in its application to batch operation. The invention may also be practiced in continuous operation. Thus, the invention may be practiced by passing a flowing stream of alkyl amine into contact with a flowing stream of alkylene oxide, and passing the mixture in liquid or vapor phase through a reaction zone maintained within the above-described limits of reaction temperature by appropriate heat control. The following examples illustrate the practice of the process in this alternative manner.

*Example IX*

Diethyl amine and ethylene oxide are pumped into a reaction tube 2" in diameter and 200 ft. long fitted with a jacket so that heat can either be abstracted or added. The tube is maintained at 180–200° C. by circulating hot oil through the jacket. The pumping of the diethyl amine and the ethylene oxide is carried out at a rate which will insure an excess of the amine being present at all times. This is accomplished by pumping the diethyl amine and ethylene oxide at a molar ratio of 1 to 0.85 at a space velocity of 250, care being taken to see that some diethyl amine is present before pumping the ethylene oxide. The products are continually removed to a series of three distilling columns. In the first column the heads are removed up to 145° C. and recycled and in the second column an intermediate cut of 145°–159.5° C. is removed. Diethyl amino ethanol, boiling between 159.5° C. and 161.5° C., is distilled from the third column.

*Example X*

Diethyl amine is pumped to a preheater which heats the amine to 160° C. A pressure of 200 pounds per square inch is observed and the amine is present largely in the liquid state. The amine then passes into a reactor fitted with baffles and an external cooling jacket. The rate of flow through the reactor and the pressure are controlled by means of a valve. Ethylene oxide is pumped in at a rate to maintain an excess of diethyl amine at all times. Such a rate is obtained if diethyl amine is pumped at a steady rate of seven pounds per hour while the ethylene oxide is being pumped at the rate of three and one-half pounds per hour. The reaction is allowed to proceed for several hours and the products are continuously removed through a condenser. Upon fractionation of the products, heads containing unreacted diethyl amine are first removed. The diethyl amino ethanol boiling at 159°–162° C. is then distilled.

While we have discussed the reaction as being performed under substantially anhydrous conditions, and it is preferred that water or water vapor be completely or almost completely excluded from the reaction mixture, the process may be performed in the presence of a small quantity of water (e. g., not in excess of 10%, based on the weight of amine present), and such operation is also included within the broad scope of the invention.

While the invention has been discussed above in relation to the condensation of alkylene oxides with amines to produce alkyl substituted alkylol amines, it will be understood that, by adding a still further quantity of alkylene oxide after addition of alkylene oxide to each of the nitrogen substituted hydrogen atoms of the amine, ethers may be formed, by continued practice of the invention. When we refer in the following claims to manufacture of condensation products by reacting alkylene oxide with amines, we therefore intend to include manufacture of these ethers by reaction of the formed alkylol amines with a further quantity of alkylene oxide.

Still further modifications will be obvious to those skilled in the art, and I do not therefore wish to be limited except by the scope of the following claims.

I claim:

1. In the manufacture of amines containing at least one aliphatic hydrocarbon radical and at least one alkylol radical as substituents for hydrogen of ammonia, the process comprising initially heating a substantially anhydrous aliphatic amine selected from the class consisting of primary and secondary amines to a reaction temperature range substantially above 100° C. and below 275° C. and then adding an equivalent amount of a substantially anhydrous alkylene oxide so slowly and gradually that the added alkylene oxide reacts substantially as rapidly as added, and material local increase in temperature is avoided, the temperature of the reaction mixture being maintained within the said range throughout the reaction.

2. In the manufacture of amines containing a total of between 2 and 8 aliphatic carbon atoms in at least one aliphatic hydrocarbon radical and at least one alkylol radical having between 2 and 4 carbon atoms as substituents for hydrogen of ammonia, the process comprising initially heating a substantially anhydrous aliphatic amine selected from the class consisting of primary and secondary aliphatic amines having between 2 and 8 carbon atoms to a reaction temperature range substantially above 100° C. and below 275° C. and then adding an equivalent amount of a substantially anhydrous alkylene oxide having between 2 and 4 carbon atoms so slowly and gradually that the added alkylene oxide reacts substantially as rapidly as added, and material local increase in temperature is avoided, the temperature of the reaction mixture being maintained within the said range throughout the reaction.

3. In the manufacture of amines containing two aliphatic hydrocarbon radicals and an alkylol radical as substituents for hydrogen of ammonia, the process comprising initially heating a substantially anhydrous di-aliphatic amine to a reaction temperature range substantially above 100° C. and below 275° C. and then adding an equivalent amount of substantially anhydrous alkylene oxide so slowly and gradually that the added alkylene oxide reacts substantially as rapidly as added, and material local increase in temperature is avoided, the temperature of the reaction mixture being maintained within the said range throughout the reaction.

4. In the manufacture of amines containing two aliphatic hydrocarbon radicals having between 1 and 4 carbon atoms in each such radical and an alkylol radical containing between 2 and 4 carbon atoms as substituents for hydrogen of ammonia, the process comprising initially heating a substantially anhydrous di-aliphatic amine containing between 1 and 4 carbon atoms in each aliphatic radical to a reaction temperature range substantially above 100° C. and below 275° C. and then adding an equivalent amount of a substantially anhydrous alkylene oxide having between 2 and 4 carbon atoms so slowly and gradually that the added alkylene oxide reacts substantially as rapidly as added, and material local increase in temperature is avoided, the temperature of the reaction mixture being maintained within the said range throughout the reaction.

5. In the manufacture of di-ethyl amino alkanols containing between 2 and 4 carbon atoms in the alkylol radical, the process comprising initially heating a substantially anhydrous di-ethyl amine to a reaction temperature range substantially above 100° C. and below 275° C. and then adding an equivalent amount of a substantially anhydrous alkylene oxide having between 2 and 4 carbon atoms so slowly and gradually that the added alkylene oxide reacts substantially as rapidly as added, and material local increase in temperature is avoided, the temperature of the reaction mixture being maintained within the said range through the reaction.

6. In the manufacture of di-ethyl amino ethanol, the process comprising heating di-ethyl amine to a reaction temperature range substantially above 100° C. and below 275° C. and then adding an equivalent amount of ethylene oxide so slowly and gradually that the added ethylene oxide reacts substantially as rapidly as added, and material local increase in temperature is avoided, the temperature of the reaction mixture being maintained within the said range throughout the reaction.

7. In the manufacture of di-ethyl amino ethanol, the process comprising heating di-ethyl amine to a reaction temperature range substantially above 130° C. and below 275° C. and then adding an equivalent amount of ethylene oxide so slowly and gradually that the added ethylene oxide reacts substantially as rapidly as added, and material local increase in temperature is avoided, the temperature of the reaction mixture being maintained within the said range throughout the reaction.

EDWARD J. SCHWOEGLER.